United States Patent
Kim et al.

(10) Patent No.: US 10,395,392 B1
(45) Date of Patent: *Aug. 27, 2019

(54) LEARNING METHOD AND LEARNING DEVICE FOR STRATEGIC TRANSFORMING RGB TRAINING IMAGE SETS INTO NON-RGB TRAINING IMAGE SETS, TO BE USED FOR LEARNING OBJECT DETECTION ON OBJECTS OF IMAGES IN NON-RGB FORMAT, BY USING CYCLE GAN, RESULTING IN SIGNIFICANTLY REDUCING COMPUTATIONAL LOAD AND REUSING DATA

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/263,275

(22) Filed: Jan. 31, 2019

(51) Int. Cl.
*G06K 9/00* (2006.01)
*G06T 7/90* (2017.01)
(Continued)

(52) U.S. Cl.
CPC .............. *G06T 7/90* (2017.01); *G06K 9/4652* (2013.01); *G06K 9/6256* (2013.01);
(Continued)

(58) Field of Classification Search
CPC .. G06K 9/6257; G06K 9/4652; G06K 9/6256; G06T 7/246; G06T 7/90;
(Continued)

(56) References Cited

U.S. PATENT DOCUMENTS 6,865,291 B1 * 3/2005 Zador ..................... G06T 9/008
348/398.1
2018/0239951 A1 * 8/2018 El-Zehiry .......... G06K 9/00147
(Continued)

*Primary Examiner* — Shefali D Goradia
(74) *Attorney, Agent, or Firm* — Husch Blackwell LLP

(57) ABSTRACT

A method for learning transformation of an annotated RGB image into an annotated Non-RGB image, in target color space, by using a cycle GAN and for domain adaptation capable of reducing annotation cost and optimizing customer requirements is provided. The method includes steps of: a learning device transforming a first image in an RGB format to a second image in a non-RGB format, determining whether the second image has a primary or a secondary non-RGB format, and transforming the second image to a third image in the RGB format; transforming a fourth image in the non-RGB format to a fifth image in the RGB format, determining whether the fifth image has a primary RGB format or a secondary RGB format, and transforming the fifth image to a sixth image in the non-RGB format. Further, by the method, training data can be generated even with virtual driving environments.

16 Claims, 4 Drawing Sheets

(51) Int. Cl.
  *G06T 11/00*  (2006.01)
  *G06N 3/04*  (2006.01)
  *G06K 9/46*  (2006.01)
  *G06K 9/62*  (2006.01)

(52) U.S. Cl.
  CPC .......... *G06N 3/0454* (2013.01); *G06T 11/001* (2013.01); *G06T 2207/10024* (2013.01); *G06T 2207/20081* (2013.01); *G06T 2207/20084* (2013.01)

(58) Field of Classification Search
  CPC .................. G06T 15/10; G06T 19/006; G06T 2207/20081; G06T 2207/10024; G06T 2207/20084; G06T 11/001; G06F 17/11; G06N 3/0454
  See application file for complete search history.

(56) References Cited

U.S. PATENT DOCUMENTS

2019/0035118 A1* 1/2019 Zhao .................... G06T 3/4046
2019/0080206 A1* 3/2019 Hotson ................ G06K 9/6264

* cited by examiner

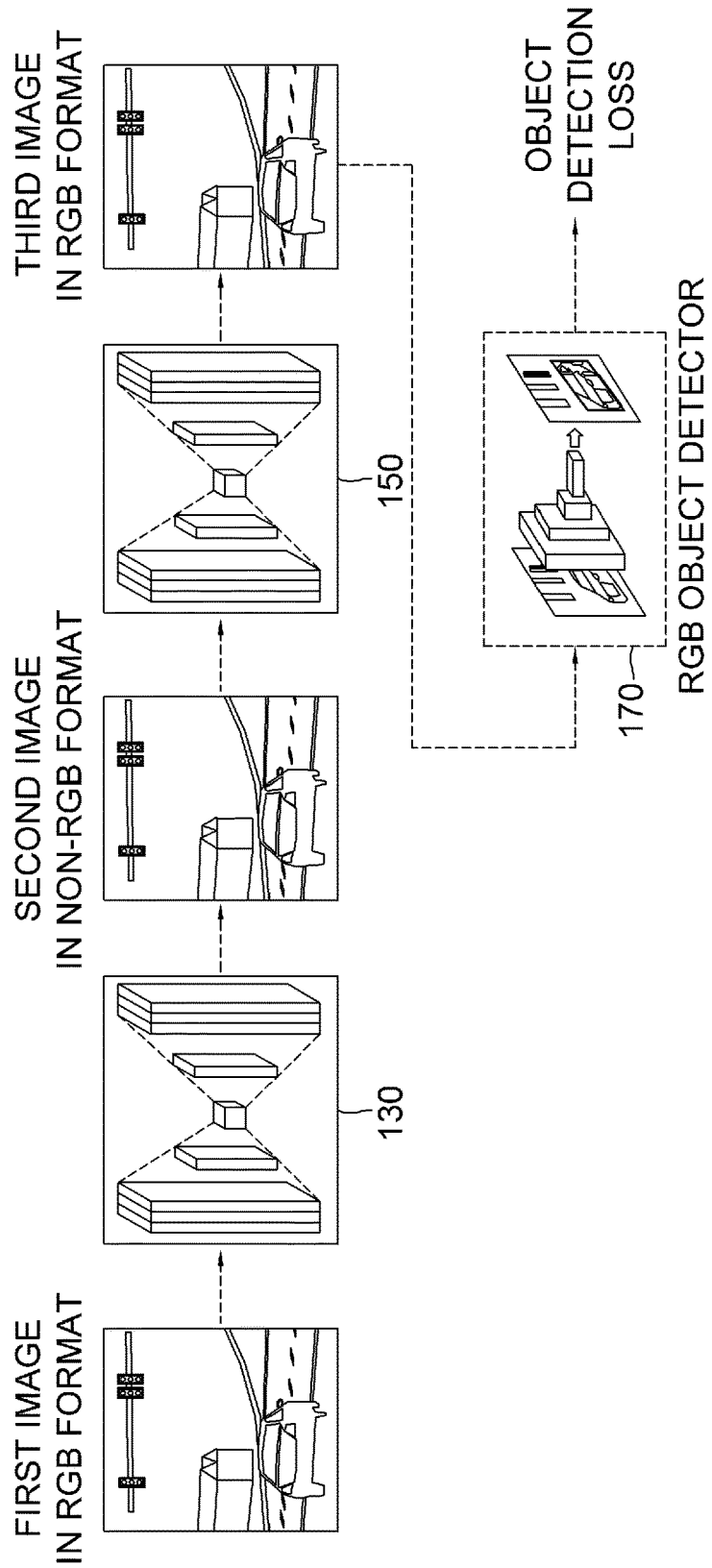

LEARNING METHOD AND LEARNING DEVICE FOR STRATEGIC TRANSFORMING RGB TRAINING IMAGE SETS INTO NON-RGB TRAINING IMAGE SETS, TO BE USED FOR LEARNING OBJECT DETECTION ON OBJECTS OF IMAGES IN NON-RGB FORMAT, BY USING CYCLE GAN, RESULTING IN SIGNIFICANTLY REDUCING COMPUTATIONAL LOAD AND REUSING DATA

FIELD OF THE DISCLOSURE

The present disclosure relates to a learning method and a learning device for use with an autonomous vehicle; and more particularly, to the learning method and the learning device for strategic transforming RGB training image sets into non-RGB training image sets by using cycle GAN, and a testing method and a testing device using the same.

BACKGROUND OF THE DISCLOSURE

Deep Convolution Neural Networks (Deep CNNs) are at the heart of the remarkable development in deep learning. CNNs have already been used in the 90's to solve problems of character recognition, but their use has become as widespread as it is now thanks to recent researches. These CNNs won the 2012 ImageNet image classification tournament, crushing other competitors. Then, the CNNs became a very useful tool in the field of machine learning.

Recently, the CNNs have been popular in an autonomous vehicles industry. When used in the autonomous vehicles industry, the CNNs perform functions of acquiring images from a camera installed on a vehicle, searching for lanes, etc. The CNNs use training images for learning to perform such functions, and these images are generally in an RGB format.

But in some cases, the CNNs must process test images in a non-RGB format. As opposed to a learning process where images in the RGB format prepared in advance are simply fed into, during testing processes, images in the non-RGB format may be acquired from cameras or sensors on an actual vehicle in operation. Since the CNNs have been learned by using images in the RGB format, the CNNs cannot process the test images in the non-RGB format properly. This is because parameters of the CNNs which have been learned are based on the RGB format.

So far, conventional technologies have solved this problem by converting the format of images acquired in the testing processes into the format of images used in the learning process, in real-time. However, since this conversion mathematically transforms values of every pixel in real-time, resultant overhead becomes major disadvantage in the autonomous vehicles where real-time processing is most important. Although such overhead may be trivial in case of transforming the YUV format into those in the RGB format whose conversion rule is simple, this cannot be applied to cases of complex conversion rules or non-existent rules.

In a nutshell, resolving the problem in the course of the testing processes is not easy, and it is better to have the CNNs re-learn their parameters by using new training images in the same format of the test images.

However, even this is problematic because, if the CNNs are to show reasonable performance, they require tens of thousands of the training images. The CNNs require the training images and their corresponding GTs, but these GTs should be generated by hand. Thus, tens of thousands of the training images cause tremendous time and money.

SUMMARY OF THE DISCLOSURE

It is an object of the present disclosure to solve all the aforementioned problems.

It is another object of the present disclosure to alleviate a problem of procuring sets of training images in a non-RGB format by transforming the sets of the training images in an RGB format into those in the non-RGB format through a cycle GAN (Generative Adversarial Network).

In accordance with one aspect of the present disclosure, there is provided a method for learning transformation of at least one annotated RGB image into at least one annotated Non-RGB image using a cycle GAN (Generative Adversarial Network), including steps of: (a) a learning device, if at least one first image in an RGB format is acquired, instructing a first transformer to transform the first image to at least one second image in a non-RGB format, instructing a first discriminator to determine whether the second image has a primary non-RGB format or a secondary non-RGB format, wherein the primary non-RGB format is the non-RGB format without a transformation from the RGB format and the secondary non-RGB format is the non-RGB format with the transformation from the RGB format, to thereby generate a 1_1-st result, and instructing a second transformer to transform the second image to at least one third image in the RGB format; (b) the learning device, if at least one fourth image in the non-RGB format is acquired, instructing the second transformer to transform the fourth image to at least one fifth image in the RGB format, instructing a second discriminator to determine whether the fifth image has a primary RGB format or a secondary RGB format, wherein the primary RGB format is the RGB format without a transformation from the non-RGB format and the secondary RGB format is the RGB format with the transformation from the non-RGB format, to thereby generate a 2_1-st result, and instructing the first transformer to transform the fifth image to at least one sixth image in the non-RGB format; and (c) the learning device calculating one or more losses by referring to at least part of the first image, the second image, the third image, the fourth image, the fifth image, the sixth image, the 1_1-st result, and the 2_1-st result, to thereby learn at least part of parameters of the first transformer, the second transformer, the first discriminator, and the second discriminator.

As one example, at the step of (c), $$G^* = \mathrm{argmin}(\log(1-D_G(G(I))) + \gamma |I - F(G(I))| + \log(1-D_F(F(X))) + \beta |X - G(F(X))|)$$

a first loss for transformation included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|.

As one example, at the step of (c), $$G^* = \mathrm{argmin}(\log(1-D_G(G(I))) + \gamma |I - F(G(I))| + \log(1-D_F(F(X))) + \beta |X - G(F(X))|) + \lambda \times OD$$

a first loss for transformation included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|, OD is an object detection loss, λ is a constant for adjusting a weight of the object detection loss, and the learning device instructs an RGB object detector, which has been learned, to detect one or more objects in the third image, and compare at least part of information on estimated locations, sizes, and classes of the objects detected in the third image and at least part of information on true locations, sizes, and classes of the objects in at least one GT corresponding to the first image, to thereby calculate the object detection loss.

As one example, at the step of (c), $$D^*_G = \operatorname{argmax}(\log(D_G(NR)) + \log(1 - D_G(G(I))))$$

an FD loss for the first discriminator included in the losses is defined by a formula above, NR is any arbitrary image in the non-RGB format, $D_G(NR)$ is a 1_2-nd result of determining the arbitrary image in the non-RGB format from the first discriminator, G(I) is the second image, and $D_G(G(I))$ is the 1_1-st result.

As one example, at the step of (c), $$D^*_F = \operatorname{argmax}(\log(D_F(R)) + \log(1 - D_F(F(X))))$$

an SD loss for the second discriminator included in the losses is defined by a formula above, R is any arbitrary image in the RGB format, $D_F(R)$ is a 2_2-nd result of determining the arbitrary image in the RGB format from the second discriminator, F(X) is the fifth image, and $D_F(F(X))$ is the 2_1-st result.

As one example, each of the first transformer and the second transformer includes at least part of an encoding layer and a decoding layer.

In accordance with another aspect of the present disclosure, there is provided a method for testing transformation of at least one annotated RGB image into at least one annotated Non-RGB image using a cycle GAN (Generative Adversarial Network), including steps of: (a) a testing device, on condition that (1) a learning device has performed processes of instructing a first transformer to transform at least one acquired first training image in an RGB format to at least one second training image in a non-RGB format, instructing a first discriminator to determine whether the second training image has a primary non-RGB format or a secondary non-RGB format, wherein the primary non-RGB format is the non-RGB format without a transformation from the RGB format and the secondary non-RGB format is the non-RGB format with the transformation from the RGB format, to thereby generate a 1_1-st result for training, and instructing a second transformer to transform the second training image to at least one third training image in the RGB format, (2) the learning device has performed processes of instructing the second transformer to transform at least one acquired fourth training image in the non-RGB format to at least one fifth training image in the RGB format, instructing a second discriminator to determine whether the fifth training image has a primary RGB format or a secondary RGB format, wherein the primary RGB format is the RGB format without a transformation from the non-RGB format and the secondary RGB format is the RGB format with the transformation from the non-RGB format, to thereby generate a 2_1-st result for training, and instructing the first transformer to transform the fifth training image to at least one sixth training image in the non-RGB format, and (3) the learning device has performed processes of calculating one or more losses by referring to at least part of the first training image, the second training image, the third training image, the fourth training image, the fifth training image, the sixth training image, the 1_1-st result for training, and the 2_1-st result for training, to thereby learn at least part of parameters of the first transformer, the second transformer, the first discriminator, and the second discriminator; acquiring at least one test image in the RGB format; and (b) the testing device instructing the first transformer to transform the test image into at least one resulting image in the non-RGB format.

As one example, the resulting image is used for learning a non-RGB object detector to detect one or more objects in the test image in the non-RGB format.

In accordance with still another aspect of the present disclosure, there is provided a learning device for learning transformation of at least one annotated RGB image into at least one annotated Non-RGB image using a cycle GAN (Generative Adversarial Network), including: at least one memory that stores instructions; and at least one processor configured to execute the instructions to: perform processes of (I) instructing a first transformer to transform at least one first image in an RGB format to at least one second image in a non-RGB format, instructing a first discriminator to determine whether the second image has a primary non-RGB format or a secondary non-RGB format, wherein the primary non-RGB format is the non-RGB format without a transformation from the RGB format and the secondary non-RGB format is the non-RGB format with the transformation from the RGB format, to thereby generate a 1_1-st result, and instructing a second transformer to transform the second image to at least one third image in the RGB format, (II) instructing the second transformer to transform at least one fourth image in the non-RGB format to at least one fifth image in the RGB format, instructing a second discriminator to determine whether the fifth image has a primary RGB format or a secondary RGB format, wherein the primary RGB format is the RGB format without a transformation from the non-RGB format and the secondary RGB format is the RGB format with the transformation from the non-RGB format, to thereby generate a 2_1-st result, and instructing the first transformer to transform the fifth image to at least one sixth image in the non-RGB format, and (III) calculating one or more losses by referring to at least part of the first image, the second image, the third image, the fourth image, the fifth image, the sixth image, the 1_1-st result, and the 2_1-st result, to thereby learn at least part of parameters of the first transformer, the second transformer, the first discriminator, and the second discriminator.

As one example, at the process of (III), $$G^* = \operatorname{argmin}(\log(1 - D_G(G(I))) + \gamma |I - F(G(I))| + \log(1 - D_F(F(X))) + \beta |X - G(F(X))|)$$

a first loss for transformation included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|.

As one example, at the process of (III), $$G^* = \operatorname{argmin}(\log(1 - D_G(G(I))) + \gamma |I - F(G(I))| + \log(1 - D_F(F(X))) + \beta |X - G(F(X))|) + \lambda \times OD$$

a first loss for transformation included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|, OD is an object detection loss, λ is a constant for adjusting a weight of the object detection loss, and the processor instructs an RGB object detector, which has been learned, to detect one or more objects in the third image, and compare at least part of information on estimated locations, sizes, and classes of the objects detected in the third image and at least part of information on true locations, sizes, and classes of the objects in at least one GT corresponding to the first image, to thereby calculate the object detection loss.

As one example, at the process of (III), $$D^*_G = \operatorname{argmax}(\log(D_G(NR)) + \log(1 - D_G(G(I))))$$

an FD loss for the first discriminator included in the losses is defined by a formula above, NR is any arbitrary image in the non-RGB format, $D_G(NR)$ is a 1_2-nd result of determining the arbitrary image in the non-RGB format from the first discriminator, G(I) is the second image, and $D_G(G(I))$ is the 1_1-st result.

As one example, at the process of (III), $$D^*_F = \operatorname{argmax}(\log(D_F(R)) + \log(1 - D_F(F(X))))$$

an SD loss for the second discriminator included in the losses is defined by a formula above, R is any arbitrary image in the RGB format, $D_F(R)$ is a 2_2-nd result of determining the arbitrary image in the RGB format from the second discriminator, F(X) is the fifth image, and $D_F(F(X))$ is the 2_1-st result.

As one example, each of the first transformer and the second transformer includes at least part of an encoding layer and a decoding layer.

In accordance with still yet another aspect of the present disclosure, there is provided a testing device for testing transformation of at least one annotated RGB image into at least one annotated Non-RGB image using a cycle GAN (Generative Adversarial Network), including: at least one memory that stores instructions; and at least one processor, on condition that a learning device (1) has performed processes of instructing a first transformer to transform at least one acquired first training image in an RGB format to at least one second training image in a non-RGB format, instructing a first discriminator to determine whether the second training image has a primary non-RGB format or a secondary non-RGB format, wherein the primary non-RGB format is the non-RGB format without a transformation from the RGB format and the secondary non-RGB format is the non-RGB format with the transformation from the RGB format, to thereby generate a 1_1-st result for training, and instructing a second transformer to transform the second training image to at least one third training image in the RGB format, (2) has performed processes of instructing the second transformer to transform at least one acquired fourth training image in the non-RGB format to at least one fifth training image in the RGB format, instructing a second discriminator to determine whether the fifth training image has a primary RGB format or a secondary RGB format, wherein the primary RGB format is the RGB format without a transformation from the non-RGB format and the secondary RGB format is the RGB format with the transformation from the non-RGB format, to thereby generate a 2_1-st result for training, and instructing the first transformer to transform the fifth training image to at least one sixth training image in the non-RGB format, and (3) has performed processes of calculating one or more losses by referring to at least part of the first training image, the second training image, the third training image, the fourth training image, the fifth training image, the sixth training image, the 1_1-st result for training, and the 2_1-st result for training, to thereby learn at least part of parameters of the first transformer, the second transformer, the first discriminator, and the second discriminator; configured to execute the instructions to: perform a process of instructing the first transformer to transform at least one test image in the RGB format into at least one resulting image in the non-RGB format.

As one example, the resulting image is used for learning non-RGB object detector to detect one or more objects in the test image in the non-RGB format.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

FIG. 4 is a drawing schematically illustrating a process of calculating an object detection loss for transforming the sets of the training images in the RGB format into those in the non-RGB format in accordance with one example embodiment of the present disclosure.

DETAILED DESCRIPTION OF THE PREFERRED EMBODIMENTS

Figure 1:
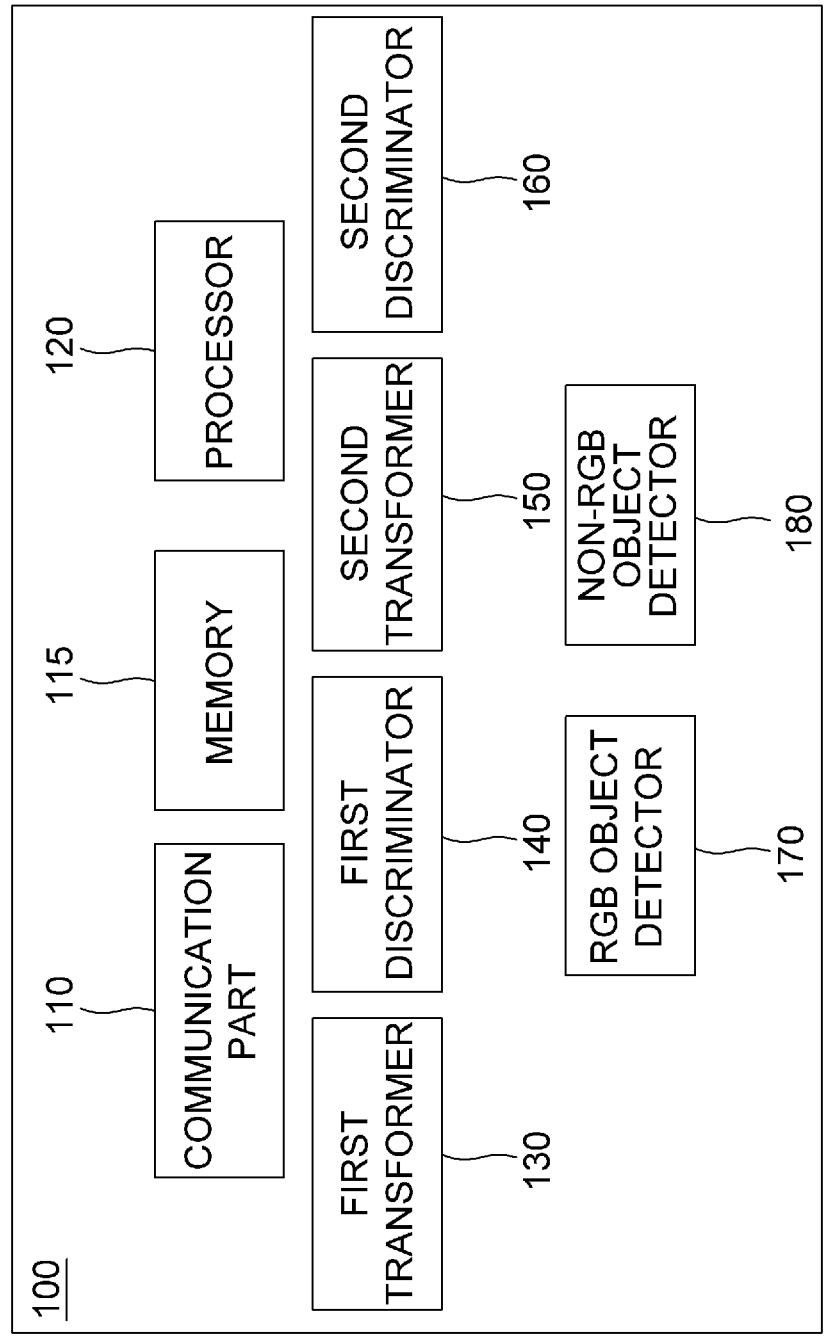
FIG. 1 is a drawing schematically illustrating a learning device performing a learning method for transforming sets of training images in an RGB format into those in a non-RGB format in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device performing a learning method for transforming sets of training images in an RGB format into a non-RGB format in accordance with one example embodiment of the present disclosure.

By referring to FIG. 1, the learning device 100 may include a first transformer 130, a first discriminator 140, a second transformer 150, a second discriminator 160, an RGB object detector 170, and a non-RGB object detector 180, which are components to be described later. Processes of input, output and computation of the first transformer 130, the first discriminator 140, the second transformer 150, the second discriminator 160, the RGB object detector 170, and the non-RGB object detector 180 may be respectively performed by a communication part 110 and a processor 120. However, detailed communication schematics between the communication part 110 and the processor 120 is omitted in FIG. 1. Herein, a memory 115 may have stored various instructions to be described later, and the processor 120 may execute the instructions stored in the memory 115 and may perform processes of the present disclosure by executing the processes to be disclosed later. Such description of the learning device 100 does not exclude an integrated device including any combination of a processor, a memory, a medium, or any other computing components.

Herein, the first transformer 130 and the second transformer 150 may respectively transform a format of an image inputted thereinto. Specifically, the first transformer 130 may transform at least one input image in the RGB format into those in the non-RGB format and the second transformer 150 may transform the input image in the non-RGB format into those in the RGB format. The non-RGB format may mean any image format other than the RGB format. For example, the non-RGB format may include YUV, IR, IR-RGB, and grayscale, but the scope of the present disclosure is not limited thereto. Also, the first transformer 130 and the second transformer 150 may be comprised of one or more CNNs, but the scope of the present disclosure is not limited thereto.

Figure 2:
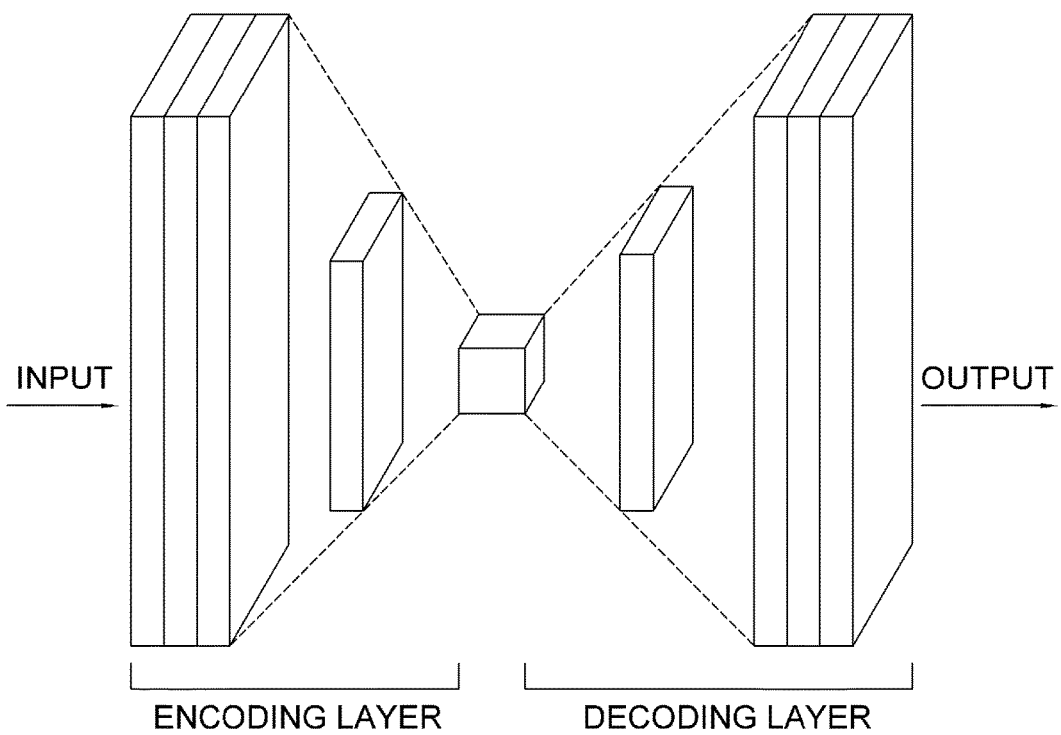
FIG. 2 is a drawing schematically illustrating a first transformer and a second transformer for transforming the sets of the training images in the RGB format into those in the non-RGB format in accordance with one example embodiment of the present disclosure.

FIG. 2 is a drawing schematically illustrating a first transformer and a second transformer for transforming the sets of the training images in the RGB format into those in the non-RGB format in accordance with one example embodiment of the present disclosure.

The first transformer 130 and the second transformer 150 may include at least part of an encoding layer and a decoding layer. The encoding layer may apply one or more convolution operations to the input image, to thereby generate at least one feature map, and the decoding layer may apply one or more deconvolution operations to the feature map, to thereby generate an image in a transformed format. As such, the transformers may transform an image in the RGB format into those in the non-RGB format and vice versa.

The first discriminator 140 and the second discriminator 160 may determine whether the input image fed thereinto is an image with the transformed format or an image with an untransformed format. Specifically, the first discriminator 140 may determine whether the input image fed thereinto has a primary non-RGB format or a secondary non-RGB format, where the primary non-RGB format is the non-RGB format without a transformation from the RGB format and the secondary non-RGB format is the non-RGB format with the transformation from the RGB format, to thereby output 1 if the former is the case and 0 if the latter is the case. Also, the second discriminator 160 may determine whether the input image fed thereinto has a primary RGB format or a secondary RGB format, where the primary RGB format is the RGB format without a transformation from the non-RGB format and the secondary RGB format is the RGB format with the transformation from the non-RGB format, to thereby output 1 if the former is the case and 0 if the latter is the case. Also, the first discriminator 140 and the second discriminator 160 may be comprised of one or more CNNs, but the scope of the present disclosure is not limited thereto.

Further, the RGB object detector 170 may be comprised of one or more CNNs, specifically, may include a convolutional layer and an FC layer. The convolutional layer may apply the convolution operations to the input image fed thereinto, to thereby generate the feature map, and the FC layer may apply a bounding box regression to the feature map, to thereby detect one or more objects. Apparently, the configuration of the RGB object detector 170 is not limited thereto. In one example embodiment, the RGB object detector 170 may have been learned by using the sets of the training images in the RGB format.

In case of the non-RGB object detector 180, it may have identical or similar configuration as that of the RGB object detector 170, and thus detailed description is omitted. However, in one example embodiment, as opposed to a case of the RGB object detector 170, the non-RGB object detector 180 may not have been learned in advance.

Figure 3:
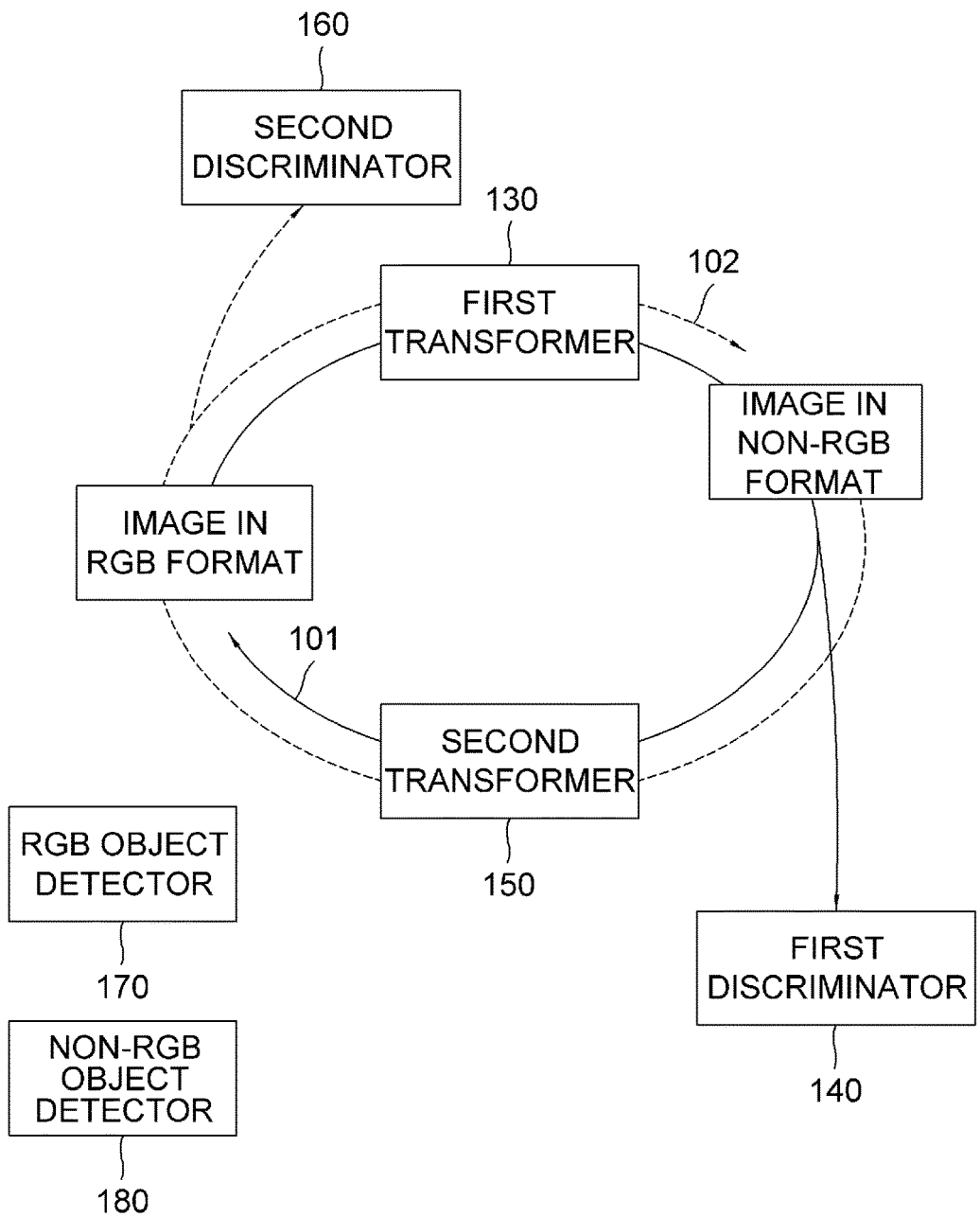
FIG. 3 is a drawing schematically illustrating the learning device for transforming the sets of the training images in the RGB format into those in the non-RGB format in accordance with one example embodiment of the present disclosure.

The configuration of the learning device 100 for learning the transformation of the sets of the training images in the RGB format into those in the non-RGB format in accordance with one example embodiment of the present disclosure is described so far, and the learning method using the learning device 100 in accordance with the present disclosure is described by referring to FIG. 3.

FIG. 3 is a drawing schematically illustrating the learning device for transforming the sets of the training images in the RGB format into those in the non-RGB format in accordance with one example embodiment of the present disclosure.

By referring to FIG. 3, general operations of the first transformer 130, the first discriminator 140, the second transformer 150, the second discriminator 160, and the RGB object detector 170 are described. There are two major processes, and each of the processes is defined as a forward process 101 and a backward process 102.

In the forward process 101, at least one first image in the RGB format is transformed into at least one second image in the non-RGB format by the first transformer 130, a 1_1-st result of determining the second image is generated by the first discriminator 140 which acquired the second image, and the second image is transformed into at least one third image in the RGB format again by the second transformer 150. The part of generating the 1_1-st result and the part of transforming the second image into the third image may occur in a different order or may occur concurrently.

In the backward process 102, at least one fourth image in the non-RGB format is transformed into at least one fifth image in the RGB format by the second transformer 150, a 2_1-st result of determining the fifth image is generated by the second discriminator 160 which acquired the fifth image, and the fifth image is transformed into at least one sixth image in the non-RGB format again by the first transformer 130. The part of generating the 2_1-st result and the part of transforming the fifth image into the sixth image may occur in a different order or may occur concurrently. Additionally, the forward process 101 and the backward process 102 may occur in a different order or may occur concurrently.

The purpose of these processes is to calculate one or more losses for better learning of the first transformer 130, the first discriminator 140, the second transformer 150, and the second discriminator 160. The processes of calculating the losses for learning each of components of the learning device 100 will be described in detail.

First, at least one first loss for transformation to be applied to the first transformer 130 and the second transformer 150 is described as follows.

$$G^* = \mathrm{argmin}(\log(1-D_G(G(I))) + \gamma |I-F(G(I))| + \log(1-D_F(F(X))) + \beta |X-G(F(X))|)$$

The first loss for transformation included in said one or more losses may be defined by a formula above, and I may be the first image, $G(I)$ may be the second image, $D_G(G(I))$ may be the 1_1-st result, $F(G(I))$ may be the third image, X may be the fourth image, $F(X)$ may be the fifth image, $D_F(F(X))$ may be the 2_1-st result, $G(F(X))$ may be the sixth image, $\gamma$ and $\beta$ may be constants for adjusting each of weights of each of $|I-F(G(I))|$ and $|X-G(F(X))|$.

Among the terms as arguments of argmin in the first loss for transformation above, $\log(1-D_G(G(I)))$ may be a term for the learning of the first transformer 130 to make the first discriminator 140 be deceived. That is, the function of argmin makes a resultant final value be decreased and thus also makes $\log(1-D_G(G(I)))$ be decreased. But since the log function is an increasing function, $1-D_G(G(I))$ within the log decreases. That is, $D_G(G(I))$ increases. Since the first discriminator 140 outputs 1 for an image without the transformed format, the term allows the first transformer 130 to learn to deceive the first discriminator 140.

The second term $\gamma|I-F(G(I))|$ may make the transformed image be similar to the original image, that is, may make the second image be similar to the first image. The term is required to reduce a difference from the original, since features in the image may not be conserved if the first transformer 130 learns just to deceive the first discriminator 140. That is, it is for the purpose of reducing $I-F(G(I))$, i.e., the difference between the first image and the third image. Herein, the difference may mean discrepancy between each of values in the first image and each of its corresponding values in the third image. Due to this second term, the part of transforming the second image into the third image is present in the forward process 101.

The functions of the third and the fourth terms are respectively similar to those of the first term and the second term, and only difference is the third and the fourth terms are used for the second transformer 150. The first transformer 130 will be learned better by the second term if the second transformer 150 is learned better. Values used for the third and the fourth terms may be acquired in the backward process 102. Other details on the third and the fourth terms are similar to those on the first and the second terms and easily inferred from the description above by those skilled in the art, and thus omitted.

Herein, $\gamma$ and $\beta$ in the formula are constants for adjusting each of weights of each of $|I-F(G(I))|$ and $|X-G(F(X))|$ as aforementioned, and if the second and the fourth terms have too much influence on the formula then the transformed image appears foggy, and if they have too little influence on the formula then the transformed image does not represent contents of the original image properly. Thus, a programmer may adjust the influence of $|I-F(G(I))|$ and $|X-G(F(X))|$ accordingly.

The first loss for transformation may further include an object detection loss. This is expressed as the formula below.

$$G^* = \mathrm{argmin}(\log(1-D_G(G(I))) + \gamma|I-F(G(I))| + \log(1-D_F(F(X))) + \beta|X-G(F(X))|) + \lambda \times OD$$

OD may mean the object detection loss and $\lambda$ may mean a constant for adjusting a weight of the object detection loss.

FIG. 4 is a drawing schematically illustrating a process of calculating the object detection loss for transforming the sets of the training images in the RGB format into those in the non-RGB format in accordance with one example embodiment of the present disclosure.

By referring to FIG. 4, the object detection loss may be calculated by the RGB object detector 170 described above. Specifically, the learning device 100 may instruct the RGB object detector 170, which has been learned, to detect one or more objects in the third image, and to compare at least part of information on estimated locations, sizes, and classes of the objects detected in the third image and at least part of information on true locations, sizes, and classes of the objects in at least one GT corresponding to the first image, to thereby calculate the object detection loss. The object detection loss may be included in the losses in order to conserve details of the objects in the image even after transformation of the format. The second term described above functions similarly, but this only makes images be similar in general, but cannot conserve selectively and preferentially the details of the objects, unlike the object detection loss does. Therefore, the performance of the first transformer 130 may be greatly improved by adding the object detection loss. The constant $\lambda$ for adjusting the weight of the object detection loss may also be adjusted by the programmer by referring to a resulting image with the transformed format.

The first loss for transformation is described so far, and calculation of losses for discriminators is described below.

$$D^*_G = \mathrm{argmax}(\log(D_G(NR)) + \log(1 - D_G(G(I))))$$

An FD loss which is a loss for the first discriminator 140 may be defined by the above formula. Herein, NR may be any arbitrary image in the non-RGB format, $D_G(NR)$ may be a 1_2-nd result of determining the arbitrary image from the first discriminator 140, G(I) may be the second image, and $D_G(G(I))$ may be the 1_1-st result. Argmax makes the whole resultant value increase, makes $D_G(NR)$ be outputted as 1, and makes $D_G(G(I))$ be outputted as 0. Therefore the first discriminator 140 may determine correctly whether the format of the inputted image was previously transformed or not. In FIG. 4, a process of inputting only the second image is shown, but the inputted image is not limited to an image with the transformed format like the second image, and any arbitrary image in the non-RGB format may be inputted. Thus an image with the transformed format and an image with the untransformed format may be used for learning with discernment.

$$D^*_F = \mathrm{argmax}(\log(D_F(R)) + \log(1 - D_F(F(X))))$$

An SD loss which is a loss for the second discriminator 160 may be defined by the above formula. Herein, R may be any arbitrary image in the RGB format, $D_F(R)$ may be a 2_2-nd result of determining the arbitrary image from the second discriminator 160, F(X) may be the fifth image, and $D_F(F(X))$ may be the 2_1-st result. As in the case of the FD loss for the first discriminator, the second discriminator 160 may determine correctly whether the format inputted was previously transformed or not, according to the above formula. The second discriminator 160, although not illustrated in FIG. 4, may also acquire any arbitrary image in the RGB format and use it for the learning.

If said one or more losses including the first loss for transformation, the FD loss for the first discriminator, and the SD loss for the second discriminator may be calculated, the learning device 100 may learn at least part of parameters of the first transformer 130, the second transformer 140, the first discriminator 150, and the second discriminator 160.

Thanks to such a learning, the first transformer 130 may conserve or nearly keep the contents of the image while transforming its format.

The learning process is described above, the testing processes after completion of the learning process are described as below.

For reference, in the description below, the phrase "for training" or "training" is added for terms related to the learning processes, and the phrase "for testing" or "testing" is added for terms related to the testing processes, to avoid possible confusion.

On condition that (1) the learning device 100 has performed processes of instructing the first transformer 130 to transform at least one acquired first training image in the RGB format to at least one second training image in the non-RGB format, instructing the first discriminator 140 to determine whether the second training image has the primary non-RGB format or the secondary non-RGB format, to thereby generate a 1_1-st result for training, and instructing the second transformer 150 to transform the second training image to at least one third training image in the RGB format; (2) the learning device 100 has performed processes of instructing the second transformer 150 to transform at least one acquired fourth training image in the non-RGB format to at least one fifth training image in the RGB format, instructing the second discriminator 160 to determine whether the fifth training image has the primary RGB format or the secondary RGB format, to thereby generate a 2_1-st result for training, and instructing the first transformer 130 to transform the fifth training image to at least one sixth training image in the non-RGB format; and (3) the learning device 100 has performed processes of calculating one or more losses by referring to at least part of the first training image, the second training image, the third training image, the fourth training image, the fifth training image, the sixth training image, the 1_1-st result for training, and the 2_1-st result for training, to thereby learn at least part of the parameters of the first transformer 130, the second transformer 150, the first discriminator 140, and the second discriminator 160, a testing device may acquire at least one test image in the RGB format.

Then, the testing device may instruct the first transformer 130 to transform the test image into at least one resulting image in the non-RGB format.

After the testing processes, if the test image is transformed into the resulting image in the non-RGB format, then the resulting image may be used for learning a non-RGB object detector to detect the objects in the test image in the non-RGB format.

As can be understood by those skilled in the art, it is clear that communication parts of the learning device and the testing device may perform transmission of image data, for example, images described above like the original image, original labels, and additional labels, etc., and that processors and/or memories of the learning device and the testing device may retain data for feature maps and performing operations, and that the processors of the learning device and the testing device may perform convolution operations, deconvolution operations, and loss value operations, but the scope of the present disclosure is not limited thereto.

The present disclosure has an effect of alleviating a problem of procuring the sets of the training images in the non-RGB format by transforming the sets of the training images in the RGB format into those in the non-RGB format with a cycle GAN (Generative Adversarial Network).

The method explained above may be used for learning transformation of an annotated RGB image into an annotated Non-RGB image, in target color space, by using the cycle GAN and for domain adaptation capable of reducing annotation cost and optimizing customer requirements. Further, by the method, training data can be generated even with virtual driving environments.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning transformation of at least one annotated RGB image into at least one annotated Non-RGB image using a cycle GAN (Generative Adversarial Network), comprising steps of:
   (a) a learning device, if at least one first image in an RGB format is acquired, instructing a first transformer to transform the first image to at least one second image in a non-RGB format, instructing a first discriminator to determine whether the second image has a primary non-RGB format or a secondary non-RGB format, wherein the primary non-RGB format is the non-RGB format without a transformation from the RGB format and the secondary non-RGB format is the non-RGB format with the transformation from the RGB format, to thereby generate a 1_1-st result, and instructing a second transformer to transform the second image to at least one third image in the RGB format;
   (b) the learning device, if at least one fourth image in the non-RGB format is acquired, instructing the second transformer to transform the fourth image to at least one fifth image in the RGB format, instructing a second discriminator to determine whether the fifth image has a primary RGB format or a secondary RGB format, wherein the primary RGB format is the RGB format without a transformation from the non-RGB format and the secondary RGB format is the RGB format with the transformation from the non-RGB format, to thereby generate a 2_1-st result, and instructing the first transformer to transform the fifth image to at least one sixth image in the non-RGB format; and
   (c) the learning device calculating one or more losses by referring to at least part of the first image, the second image, the third image, the fourth image, the fifth image, the sixth image, the 1_1-st result, and the 2_1-st result, to thereby learn at least part of parameters of the first transformer, the second transformer, the first discriminator, and the second discriminator.

2. The method of claim 1, wherein, at the step of (c), $$G^* = \mathrm{argmin}(\log(1 - D_G(G(I))) + \gamma |I - F(G(I))| + \log(1 - D_F(F(X))) + \beta |X - G(F(X))|)$$

a first loss for transformation included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, $\gamma$ and $\beta$ are constants for adjusting each of weights of each of $|I - F(G(I))|$ and $|X - G(F(X))|$.

3. The method of claim 1, wherein, at the step of (c), $$G^* = \mathrm{argmin}(\log(1 - D_G(G(I))) + \gamma |I - F(G(I))| + \log(1 - D_F(F(X))) + \beta |X - G(F(X))| + \lambda \times OD)$$

a first loss for transformation included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, $\gamma$ and $\beta$ are constants for adjusting each of weights of each of $|I - F(G(I))|$ and $|X - G(F(X))|$, OD is an object detection loss, $\lambda$ is a constant for adjusting a weight of the object detection loss, and wherein the learning device instructs an RGB object detector, which has been learned, to detect one or more objects in the third image, and compare at least part of information on estimated locations, sizes, and classes of the objects detected in the third image and at least part of information on true locations, sizes, and classes of the objects in at least one GT corresponding to the first image, to thereby calculate the object detection loss.

4. The method of claim 1, wherein, at the step of (c), $$D^*_G = \mathrm{argmax}(\log(D_G(NR)) + \log(1 - D_G(G(I))))$$

an FD loss for the first discriminator included in the losses is defined by a formula above, NR is any arbitrary image in the non-RGB format, $D_G(NR)$ is a 1_2-nd result of determining the arbitrary image in the non-RGB format from the first discriminator, G(I) is the second image, and $D_G(G(I))$ is the 1_1-st result.

5. The method of claim 1, wherein, at the step of (c), $$D^*_F = \mathrm{argmax}(\log(D_F(R)) + \log(1 - D_F(F(X))))$$

an SD loss for the second discriminator included in the losses is defined by a formula above, R is any arbitrary image in the RGB format, $D_F(R)$ is a 2_2-nd result of determining the arbitrary image in the RGB format from the second discriminator, F(X) is the fifth image, and $D_F(F(X))$ is the 2_1-st result.

6. The method of claim 1, wherein each of the first transformer and the second transformer includes at least part of an encoding layer and a decoding layer.

7. A method for testing transformation of at least one annotated RGB image into at least one annotated Non-RGB image using a cycle GAN (Generative Adversarial Network), comprising steps of:
   (a) a testing device, on condition that (1) a learning device has performed processes of instructing a first transformer to transform at least one acquired first training image in an RGB format to at least one second training image in a non-RGB format, instructing a first discriminator to determine whether the second training image has a primary non-RGB format or a secondary non-RGB format, wherein the primary non-RGB format is the non-RGB format without a transformation from the RGB format and the secondary non-RGB format is the non-RGB format with the transformation from the RGB format, to thereby generate a 1_1-st result for training, and instructing a second transformer to transform the second training image to at least one third training image in the RGB format, (2) the learning device has performed processes of instructing the second transformer to transform at least one acquired fourth training image in the non-RGB format to at least one fifth training image in the RGB format, instructing a second discriminator to determine whether the fifth training image has a primary RGB format or a secondary RGB format, wherein the primary RGB format is the RGB format without a transformation from the non-RGB format and the secondary RGB format is the RGB format with the transformation from the non-RGB format, to thereby generate a 2_1-st result for training, and instructing the first transformer to transform the fifth training image to at least one sixth training image in the non-RGB format, and (3) the learning device has performed processes of calculating one or more losses by referring to at least part of the first training image, the second training image, the third training image, the fourth training image, the fifth training image, the sixth training image, the 1_1-st result for training, and the 2_1-st result for training, to thereby learn at least part of parameters of the first transformer, the second transformer, the first discriminator, and the second discriminator; acquiring at least one test image in the RGB format; and (b) the testing device instructing the first transformer to transform the test image into at least one resulting image in the non-RGB format.

8. The method of claim 7, wherein the resulting image is used for learning a non-RGB object detector to detect one or more objects in the test image in the non-RGB format.

9. A learning device for learning transformation of at least one annotated RGB image into at least one annotated Non-RGB image using a cycle GAN (Generative Adversarial Network), comprising:
at least one memory that stores instructions; and
at least one processor configured to execute the instructions to: perform processes of (I) instructing a first transformer to transform at least one first image in an RGB format to at least one second image in a non-RGB format, instructing a first discriminator to determine whether the second image has a primary non-RGB format or a secondary non-RGB format, wherein the primary non-RGB format is the non-RGB format without a transformation from the RGB format and the secondary non-RGB format is the non-RGB format with the transformation from the RGB format, to thereby generate a 1_1-st result, and instructing a second transformer to transform the second image to at least one third image in the RGB format, (II) instructing the second transformer to transform at least one fourth image in the non-RGB format to at least one fifth image in the RGB format, instructing a second discriminator to determine whether the fifth image has a primary RGB format or a secondary RGB format, wherein the primary RGB format is the RGB format without a transformation from the non-RGB format and the secondary RGB format is the RGB format with the transformation from the non-RGB format, to thereby generate a 2_1-st result, and instructing the first transformer to transform the fifth image to at least one sixth image in the non-RGB format, and (III) calculating one or more losses by referring to at least part of the first image, the second image, the third image, the fourth image, the fifth image, the sixth image, the 1_1-st result, and the 2_1-st result, to thereby learn at least part of parameters of the first transformer, the second transformer, the first discriminator, and the second discriminator.

10. The learning device of claim 9, wherein, at the process of $$G^* = \mathrm{argmin}(\log(1-D_G(G(I)))+\gamma|I-F(G(I))|+\log(1-D_F(F(X)))+\beta|X-G(F(X))|)$$

a first loss for transformation included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|.

11. The learning device of claim 9, wherein, at the process of $$G^* = \mathrm{argmin}(\log(1-D_G(G(I)))+\gamma|I-F(G(I))|+\log(1-D_F(F(X)))+\beta|X-G(F(X))|)+\lambda \times OD$$

a first loss for transformation included in said one or more losses is defined by a formula above, I is the first image, G(I) is the second image, $D_G(G(I))$ is the 1_1-st result, F(M) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|, OD is an object detection loss, X is a constant for adjusting a weight of the object detection loss, and wherein the processor instructs an RGB object detector, which has been learned, to detect one or more objects in the third image, and compare at least part of information on estimated locations, sizes, and classes of the objects detected in the third image and at least part of information on true locations, sizes, and classes of the objects in at least one GT corresponding to the first image, to thereby calculate the object detection loss.

12. The learning device of claim 9, wherein, at the process of $$D^*_G = \mathrm{argmax}(\log(D_G(NR))+\log(1-D_G(G(I))))$$

an FD loss for the first discriminator included in the losses is defined by a formula above, NR is any arbitrary image in the non-RGB format, $D_G(NR)$ is a 1_2-nd result of determining the arbitrary image in the non-RGB format from the first discriminator, G(I) is the second image, and $D_G(G(I))$ is the 1_1-st result.

13. The learning device of claim 9, wherein, at the process of $$D^*_F = \mathrm{argmax}(\log(D_F(R))+\log(1-D_F(F(X))))$$

an SD loss for the second discriminator included in the losses is defined by a formula above, R is any arbitrary image in the RGB format, $D_F(R)$ is a 2_2-nd result of determining the arbitrary image in the RGB format from the second discriminator, F(X) is the fifth image, and $D_F(F(X))$ is the 2_1-st result.

14. The learning device of claim 9, wherein each of the first transformer and the second transformer includes at least part of an encoding layer and a decoding layer.

15. A testing device for testing transformation of at least one annotated RGB image into at least one annotated Non-RGB image using a cycle GAN (Generative Adversarial Network), comprising:
at least one memory that stores instructions; and
at least one processor, on condition that a learning device (1) has performed processes of instructing a first transformer to transform at least one acquired first training image in an RGB format to at least one second training image in a non-RGB format, instructing a first discriminator to determine whether the second training image has a primary non-RGB format or a secondary non-RGB format, wherein the primary non-RGB format is the non-RGB format without a transformation from the RGB format and the secondary non-RGB format is the non-RGB format with the transformation from the RGB format, to thereby generate a 1_1-st result for training, and instructing a second transformer to transform the second training image to at least one third training image in the RGB format, (2) has performed processes of instructing the second transformer to transform at least one acquired fourth training image in the non-RGB format to at least one fifth training image in the RGB format, instructing a second discriminator to determine whether the fifth training image has a primary RGB format or a secondary RGB format, wherein the primary RGB format is the RGB format without a transformation from the non-RGB format and the secondary RGB format is the RGB format with the transformation from the non-RGB format, to thereby generate a 2_1-st result for training, and instructing the first transformer to transform the fifth training image to at least one sixth training image in the non-RGB format, and (3) has performed processes of calculating one or more losses by referring to at least part of the first training image, the second training image, the third training image, the fourth training image, the fifth training image, the sixth training image, the 1_1-st result for training, and the 2_1-st result for training, to thereby learn at least part of parameters of the first transformer, the second transformer, the first discriminator, and the second discriminator; configured to execute the instructions to: perform a process of instructing the first transformer to transform at least one test image in the RGB format into at least one resulting image in the non-RGB format.

16. The testing device of claim 15, wherein the resulting image is used for learning non-RGB object detector to detect one or more objects in the test image in the non-RGB format.

* * * * *